July 3, 1962
J. P. HEISS ETAL
3,042,393
MOUNTING FOR VEHICLE STRUT
Filed April 27, 1959
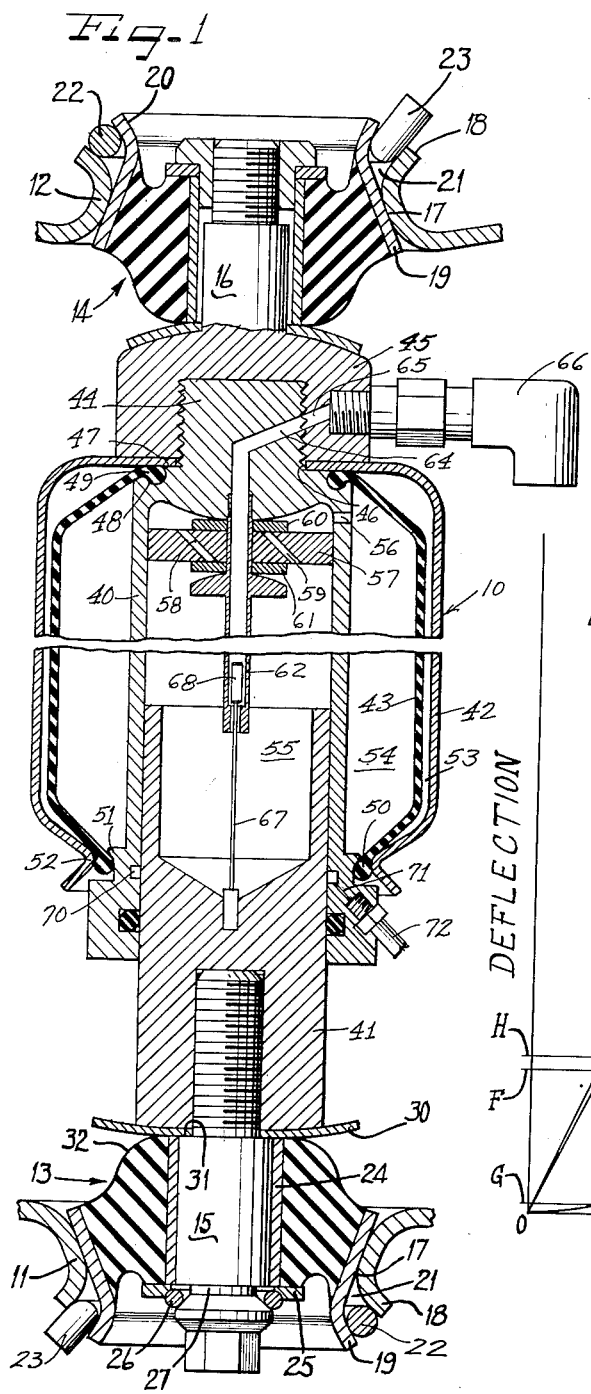
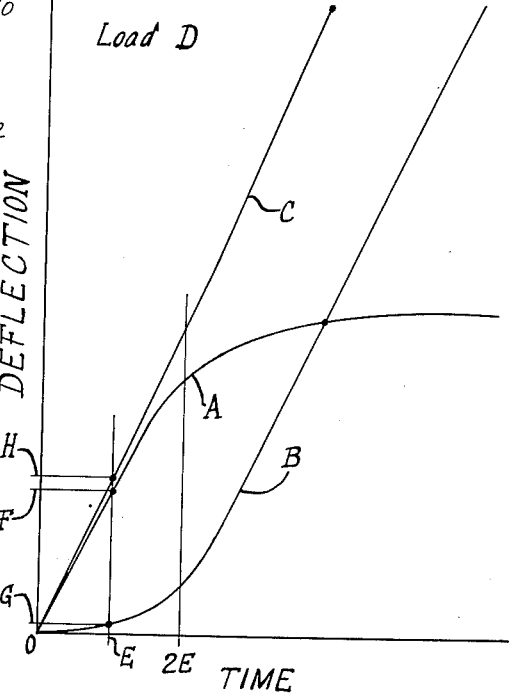
Inventors
John P. Heiss
Herbert W. Templeton
by Hill, Sherman, Meroni, Gross & Simpson
Attys United States Patent Office 3,042,393

Patented July 3, 1962

1

3,042,393
MOUNTING FOR VEHICLE STRUT

John P. Heiss, Flint, and Herbert W. Templeton, Southfield, Mich., assignors to Thompson Ramo Wooldridge Inc., Cleveland, Ohio, a corporation of Ohio Filed Apr. 27, 1959, Ser. No. 809,286
4 Claims. (Cl. 267—35)

The present invention relates to mounting assemblies and is, more particularly, directed to an improved resilient mount for vehicular suspension struts or the like.

In recent years the automotive industry has adopted reciprocating or airplane-type shock absorbers for connection between the vehicle axle and the frame of the automobile arranged with the axis of reciprocation of the shock absorber parts in a generally vertical axis. With still more recent developments, automatic leveling systems have been provided for automotive vehicles and several forms of such leveling systems have employed reciprocating type expanding members, which are likewise positioned between the vehicle axle and the frame. In the systems employing such reciprocating struts, either of the shock absorbing or leveling type, it has been usual to provide a rubber bushing between the opposite ends of the individual strut and a respective axle and frame. Such resilient connections usually comprise one of the following:

(1) An eye secured to each end of the reciprocating expandable strut member, an annular rubber bushing in each eye and a stud secured within each such resilient bushing and rigidly secured, in turn, to the vehicle frame or axle with the axis of each stud lying transverse to the axis of the reciprocal strut, or (2) A longitudinal stud on the strut cooperating with a pair of annular bushings placed above and below an apertured bracket on the frame, or (3) The provision of an annular bushing at each end of the reciprocable strut member between the vehicle axle and the frame mounted for confined compression generally axially of its longitudinal axis.

A bushing of the type noted in sub-paragraph three above may be constructed with a generally frusto-conical configuration having the minimum external diameter positioned at a point remote from the strut. In such instances the strut is provided with a longitudinally extending projection passing through the aperture in the annular bushing and secured thereto so that movement of the strut forces the central portion of the generally conical mass of rubber into the restricted passageway formed by the generally conical outside diameter of the bushing which is supported in a conforming frusto-conical casing. In this manner the rubber of the bushing is thus compressed and confined at the same time. The controlled confinement thus achieved by the construction hereinbefore described is utilized to provide a mounting capable of limited resiliency with cushioned over-travel prevention.

Applicant has found that when a conical rubber mount or bushing of the type hereinbefore described which has a relatively high spring rate and low mass is mounted on the end or on each end of a reciprocable strut of substantial mass having a relatively low spring rate the initial or vibrational movement in the system is always substantially in the conical rubber mount or bushing and subsequent movement is in the strut itself.

In this manner the undesirable hysteresis effect which may be encountered in hydraulic or hydropneumatic levelling struts is obviated where the suspension linkage is subjected to vibrational forces or to any forces of relatively short duration because such movement between the

2 vehicle axle and the frame is taken up in the conical rubber bushings rather than in the reciprocable strut itself.

When a suspension linkage comprising a reciprocating strut and bushing of the type hereinbefore described is subjected to a given force instantaneously applied substantially all the initial deflection in the linkage is in the bushing due partially to the relatively great differences in the inertia of the two members. It is well known that the inertia of a body is directly proportional to the mass thereof so that, in the instant case, the relatively heavy strut has a much greater tendency to remain unmoved when the linkage is subjected to shock. As a result, if the bushing and strut are initially in a state of rest and a force is subsequently applied to the linkage the bushing deflects first and, if the force is applied for a relatively long duration (still measured in fractions of seconds) and is not an instantaneous one, the strut will move collapsibly to absorb the shock. If, on the other hand, the force is applied and removed instantaneously, as are all normal vibrational forces, nearly all of the deflection will be in the bushing rather than in the reciprocable strut so that the function of the strut and mounting to filter out shock is best effected. It will of course be understood that the time differential between the instant when the bushing begins to deflect and the instant when the strut begins to deflect is relatively small and would generally be measured in fractions of seconds.

It will further be understood that when two members which have different vibratory frequencies are interconnected with one another and are subjected to vibrational forces the motion of one tends to damp the motion of the other by "spoiling" the tuning thereof. Thus, the affinity of the strut to move collapsibly upon the application of forces thereagainst is further tempered so as to lengthen the life thereof while nothing is done to interfere with the compensating collapsible motion of the strut when subjected to sustained forces. Thus, in a suspension linkage including a high rate spring such as the frusto-conical rubber bushing hereinbefore described in combination with a low rate spring of substantial mass, one tends to damp the other by effectively "spoiling" the tuning thereof while, at the same time, the restraining inertia of the strut further acts to prevent the strut from compensating for axial forces instantaneously acting upon the suspension linkage.

The hydropneumatic strut may be individually internally damped by selectively varying the effective size of hydraulic fluid flow orifices associated with the strut to restrict movement of the fluid therein. Similarly the bushing can be individually damped by adding fillers and/or changing the durometer hardness thereof in the molding operation to thereby effectively vary the damping action of the bushing on the strut.

Accordingly, it is a principal object of the present invention to provide an improved vehicular suspension linkage.

It is another object of the present invention to provide a resilient mounting for vehicle struts including a high mass strut and low mass mounting bushings wherein vibrational or short duration forces applied thereto are absorbed largely by the mounting itself and not by the strut.

It is a still further and important object of the present invention to provide a plurality of pairs of springs for interconnecting a vehicle frame with an axle wherein at least one of the springs in each pair has a relatively high spring rate and low mass and wherein the other of the springs has a relatively low spring rate and is of relatively substantial mass.

Yet another object of the present invention is to provide a spring linkage for interconnecting members movable with respect to one another including a reciprocable strut and bushings interconnecting the strut with the members wherein the strut is arranged to function hysteretically with respect to the bushing.

These and other objects of the invention will become apparent from time to time as the following specification proceeds and with reference to the accompanying drawings wherein:

FIGURE 1 is a side elevational view of a strut secured to a pair of opposed members by means of the frusto-conical mounting elements hereinbefore described; and FIGURE 2 is a graph schematically illustrating the deflection-time curves for a given applied force for a suspension linkage constructed in accordance with the principles of the present invention.

As may be seen from a consideration of FIGURE 1, a generally vertically extending strut 10 is arranged for attachment to opposed members 11 and 12 by means of resilient mounting members 13 and 14, respectively. As above noted, one important use for the present invention lies in the automotive field in which strut 10 would take the form of a reciprocably collapsible pneumatic or hydropneumatic spring of relatively low spring rate, for example, fifty pounds per inch deflection or less. The member 11 would then comprise a sheet metal bracket rigidly secured to the vehicle axle or a part moving therewith, and the member 12 would comprise a stamped metal portion of the vehicle body frame.

The strut 10 is provided with axially extending projection shaft ends 15 and 16 for cooperation with the respective mounting members 13 and 14. The member 11 is constructed of sheet metal and provided with a pierced opening having a generally conically shaped internal surface 17 having an outwardly turned lip 18 at the minor, or small, diameter of the cone. The mounting element 13 likewise is provided with a generally frusto-conical annular casing 19 having a turned-out lip 20 at the minor diameter thereof. The conical portion of the casing 19 is substantially longer than the conical portion 17 of the member 12 and, as a result, a space 21 is provided between the lips 18 and 20. The lip 20 has a maximum outside diameter slightly less than the minimum inside diameter of the conical surface 17 and, as a result, the casing 19 may be inserted through the member 12 upwardly into the position illustrated in FIGURE 1. It is retained in this position positively by means of a spring snap ring 22 having a pair of turned up ends 23 which may be grasped and expanded for insertion and removal from the space 21. The mounting element 14 is likewise mounted in member 12 by similar parts designated by like numerals.

As shown, the portion of the resilient mounting between the casing 19 and the stud 15 is constructed of resilient material such as rubber. This material is bonded to the casing 19 and likewise is bonded to a metal bushing sleeve 24, which in turn is slidably mounted on the shaft or stud extension 15. The sleeve 24 is secured in position against the main body of the strut 10 by means of a washer 25 secured in position by means of a split retaining ring 26 of conventional construction. The ring 26 cooperates with a groove 27 in the conventional, releasable, manner.

The main spring or hydropneumatic strut 10 comprises generally a cylindrical member 40, a piston 41, a casing 42, a bladder 43, and is connected at its opposite ends to the mounting members 13 and 14.

The cylindrical member 40 has an axially extending boss 44 formed at one end thereof which is threadedly mounted in an end cap 45 which, in turn, is formed integrally with the shaft 16. The casing 42 fits about the cylindrical member 40 and has an aperture 46 formed in one end thereof through which the boss 44 extends. The bladder 43 is elongated and is apertured at opposite ends thereof so that it may be fitted over the cylindrical member 40. It will be noted that the cylindrical member has a shoulder 47 disposed intermediate the boss 44 and the radially enlarged cylindrical portion thereof which has an annular groove 48 formed therein. An annular bead 49 is formed about the aperture at one end of the bladder 43 which is adapted to be received within the groove 48 and which is maintained therein by abutment with the apertured end of the casing 42. An annular bead 50 is similarly formed at the opposite end of the bladder 43 and is maintained in engagement with an annular outturned lip 51 formed integrally with the cylindrical member 40 by an annular inturned portion 52 of the casing 42.

Thus, the bladder 43 serves to divide the area between the casing 42 and the cylindrical member 40 into two chambers on opposite sides thereof; a pneumatic chamber 53 being formed intermediate the casing 42 and the bladder 43 and a hydraulic chamber 54 being formed intermediate the bladder 43 and the cylindrical member 40.

It will be understood that the shaft 15 is threadedly mounted in the piston 41 and that the piston is, in turn, slidably disposed within the cylinder 40. A hydraulic pressure chamber 55 is thus formed within the hollow interior of the cylindrical member 40 and is communicable with the hydraulic chamber 54 through an orifice 56. A plate 57 is seated within the hollow interior of the cylindrical member 40 and is sealed to the walls thereof and has a pair of diagonally formed apertures 58 and 59 formed therein. Flexible plates 60 and 61 are centrally affixed to opposite sides of the plate 57 and are so arrange that they will flex away from the surface of the plate 57 under the influence of hydraulic pressure to permit a restricted flow of fluid through the apertures 58 and 59. Accordingly, when fluid pressure on the upper surface of the plate 57 becomes greater than the fluid pressure below the plate the flexible plate 61 will flex downwardly to permit a restricted flow of fluid through the aperture 58. Conversely, when the fluid pressure within the chamber 55 below the plate 57 becomes substantially greater than the fluid pressure above the plate, flexible plate 60 will flex upwardly to permit a retrograde flow of fluid through the aperture 59.

In view of the foregoing, when the strut 10 is subjected to a shock load the piston 41 will tend to move upwardly within the cylindrical member 40 thereby compressing the hydraulic fluid within the chamber 55 and forcing the same, in a restricted flow, through the aperture 59. Fluid within chamber 55 will thus flow from the undersurface to the upper surface of the plate 57 and will subsequently flow through orifice 56 into hydraulic chamber 54 where it will act to move the resilient wall 43 outwardly to compress the gas within pneumatic chamber 53.

A conduit 62 is coaxially mounted in the cylindrical member 40 and extends downwardly into the interior of the chamber 55 and is communicable with a passageway 64 formed in the member 40 which, in turn, is disposed in registry with a passage 65 formed in the end cap 45. A fitting 66 is threadedly mounted in a radially enlarged portion of the passage 65 and is adapted to be connected through suitable tubing or the like to a hydraulic pump thereby providing a means for constantly supplying the chamber 55 with pressurized hydraulic fluid.

A throttling valve 67 is coaxially mounted in the piston 41 and extends upwardly therefrom and has a valve 68 mounted on the upper end thereof which is disposed for reciprocable movement within the conduit 62 so as to throttle the flow of fluid from the fluid pump.

When the strut 10 is subjected to a shock load the piston 41 is urged to move upwardly within the cylinder 40 to force the hydraulic fluid within chamber 55 through orifice 59 and thence into the chamber 54. As hydraulic pressure within chamber 54 builds up, the resilient wall 43 is moved outwardly thereby compressing the gas within pneumatic chamber 53. When the piston 41 is in this upward position the valve 68 is positioned within the radially enlarged portion of the conduit 62 to permit a maximum flow of fluid therepast from the fluid pump. The increased inflow of fluid to the chamber 55 from the conduit 62 in combination with the retrograde flow of fluid from the chamber 54 due to re-expansion of compressed fluid within pneumatic chamber 53 acts to move the piston 41 extensibly to its normal position.

In view of the foregoing, it will be apparent that the collapsible action of the strut may be damped by varying the effective flow areas of the orifices 58 and 59 or by utilizing different plates 60 and 61 having greater or less flexing characteristics.

A constant bleed from the chamber 55 is effected by means of a fluid trap 70 which constitutes a groove formed in the cylinder 40 and an outlet passage and pipe 71 and 72, respectively, which are communicable with the fluid trap 70. Pressurized fluid within the chamber 55 seeps along the piston 41 intermediate the outer surface thereof and the inner wall of the cylinder 40 until it reaches the trap 70. Fluid collected in trap 70 is then directed through the passage 71 and suitable pipe or tubing 72 to the fluid pump where it again begins another flow cycle.

The strut is so constructed that the minimum flow area intermediate the valve 68 and the diametrically reduced lower end portion of the conduit 62 is greater than the maximum flow area intermediate the mating surfaces of the cylinder 40 and the piston 41. Hydraulic pressure within the chamber 55 is thus maintained at a predetermined minimum.

The resilient flow of the rubber mounting 13 is controlled upon downward movement of the strut 10 relative to the member 11, by means of the conical configuration of the casing 19 and the generally segmental spherical backing plate 30 secured to the bottom face of the strut 10 by means of a shoulder 31 on the shaft or stud 15. As a result of this construction, the application of a downwardly directed load on the strut 10 will cause deflection of the resilient material in the mounting 13 downwardly into the restriction formed by the conical housing 19. This will cause the upper portion 32 of the resilient material to bulge radially outwardly in contact with the curved backing plate 30.

The bushing has a total mass only a small fraction of that of the strut, for example, one pound as compared with seventeen pounds. Further, the spring rate of the bushing is substantially greater than that of the strut. For example, the bushings 13, 14 may have a varying spring rate beginning at a minimum value of approximately 1000 pounds per inch and sharply increasing to a much higher value at a maximum bushing deflection of about .5 inch.

Referring now particularly to the graph illustrated in FIGURE 2 it will be noted that the ordinate is a measure of spring (or bushing) deflection and that the abscissa is a measure of time. As has hereinbefore been explained it will be understood that the total time interval which is illustrated on the graph is quite short and would generally represent only a fraction of a second, while the deflection would generally be measured in fractions of inches. Curve A represents the time deflection curve for a rubber mount or bushing of the type herein described having a high spring rate and low mass while curve B denotes the time-deflection curve of a reciprocable strut of the type also hereinbefore described having a low spring rate and high mass. Curve C is equal to the sum of curves A and B and indicates the time-deflection curve for a suspension linkage comprising bushing A and strut B when subjected to a given load or force D (not indicated).

Thus, when load D is applied to the suspension linkage for E seconds the deflection F in the bushing is many times greater than the deflection G in the strut and accordingly, represents the great percentage of the total magnitude of deflection H in the suspension linkage. At about 2E seconds, however, the restraining inertia and static friction of the reciprocable strut is overcome, and it then moves resiliently collapsibly to absorb the shock. As shown, this combination provides a substantially constant deflection rate with time (curve C).

Applicant has found that most vibrational forces are applied over a period of time somewhere within the range of zero–2E so that all such forces are compensated for in the linkage substantially by the bushing.

It will also be understood that the hydropneumatic strut and the supporting bushing may be individually internally damped to decrease compensating movement of the linkage system to thereby increase stability. As hereinbefore explained, the resilient bushing can be internally damped merely by varying the durometer hardness of the bushing by suitable compounding in the molding operation and through the use of mechanical expedients. The hydraulic or hydropneumatic suspension strut can be likewise internally damped by suitably orificing the hydraulic flow passages associated with the strut.

It will thus be noted that applicant has provided a suspension linkage employing a collapsible strut and a resilient mounting therefor wherein vibratory loads or loads applied to the linkage for a short period of time are substantially absorbed by the mounting.

It will further be apparent that applicant accomplishes these novel and advantageous characteristics by combining a strut having a relatively high mass and a low spring rate with a mounting therefor having a relatively small mass and a high spring rate so that the strut moves hysteretically with respect to the mounting when a load is applied to the linkage.

It will herein further be understood that this embodiment of the invention has been used for illustrative purposes only and that various modifications and variations in the present invention may be effected without departing from the spirit and scope of the novel concepts thereof.

We claim as our invention:

1. A vehicle suspension system for supporting a vehicle body member relative to a vehicle wheel member comprising a spring for supporting the weight of the body member over said wheel member and resilient bushing means between said spring and at least one of said members in force-transmitting series relation between said spring and said one member, said spring having a high mass and low spring rate and said bushing having a relatively much smaller mass and a relatively higher spring rate, said bushing deflecting initially at a generally constant rate but providing a rapidly increasing spring rate upon further application of force, said bushing comprising an outer conical housing element and a backing plate element facing the open end of the housing with a generally conical volume of resilient material therebetween and partially confined thereby, providing initial deflection of the resilient material until the backing plate element substantially confines and comprises said resilient material in the conical volume and appreciable further deflection of the bushing upon an increase in force is prevented, whereby upon the application of an impact to the suspension the bushing initially compresses while the spring is unaffected due to the inertia thereof and continued application of the impact force causes deflection of the spring providing an over-all generally constant deflection rate for said suspension.

2. A vehicle suspension system for supporting a vehicle body member relative to a vehicle wheel member comprising a spring for supporting the weight of the body member over said wheel member and resilient bushing means between said spring and said members in force-transmitting series relation between said spring and said members, said spring having a high mass and low spring rate and said bushing means having a relatively much smaller mass and a relatively higher spring rate, said bushing means deflecting initially at a generally constant rate but providing a rapidly increasing spring rate upon the further application of force, said bushing means comprising respective conical housing elements and backing plate elements between said spring and each of said members, the backing plate element in each case facing the open end of the conical element with a generally conical volume of resilient material therebetween and partially confined thereby, providing initial deflection of the resilient material upon the application of a force until the backing plate element substantially confines and compresses said resilient material in the conical volume and appreciable further deflection of the resilient material is prevented, whereby upon the application of an impact force to the suspension the bushing means initially deflects while the spring remains unaffected due to the inertial thereof and continued application of the impact force causes deflection of the spring thus providing a smooth deflection of the suspension system under all load conditions.

3. A suspension system constructed in accordance with claim 1 wherein said housing conical element is secured to said wheel and said backing plate is secured to said spring.

4. A suspension system constructed in accordance with claim 2 in which the conical housing elements are in each case secured to respective body and wheel members with said spring therebetween.

References Cited in the file of this patent

UNITED STATES PATENTS

| | | |
|---|---|---|
| 2,096,005 | Piron | Oct. 19, 1937 |
| 2,320,314 | Trask | May 25, 1943 |
| 2,648,536 | Udstad | Aug. 11, 1953 |
| 2,916,296 | Muller | Dec. 8, 1959 |

FOREIGN PATENTS

| | | |
|---|---|---|
| 1,120,480 | France | Apr. 16, 1956 |
| 780,612 | Great Britain | Aug. 17, 1957 |